United States Patent [19]

Opheij et al.

[11] Patent Number: 4,924,082
[45] Date of Patent: May 8, 1990

[54] OPTICAL SCANNING DEVICE, MIRROR OBJECTIVE SUITABLE FOR USE IN SAID DEVICE AND OPTICAL WRITE AND/OR READ APPARATUS PROVIDED WITH SAID DEVICE

[75] Inventors: Willem G. Opheij; Josephus J. M. Braat, both of Eindhoven, Netherlands

[73] Assignee: U.S. Philips Corporation, New York, N.Y.

[21] Appl. No.: 319,773

[22] Filed: Mar. 7, 1989

[30] Foreign Application Priority Data

Dec. 13, 1988 [NL] Netherlands ............... 8803048

[51] Int. Cl.$^5$ .............................................. H01J 3/14
[52] U.S. Cl. ................................. 250/216; 350/443; 350/162.21
[58] Field of Search ............. 250/216, 201; 369/112, 369/44, 45, 46; 350/442, 443, 444, 446, 162.11, 162.21, 162.23

[56] References Cited

U.S. PATENT DOCUMENTS

| 3,825,322 | 7/1974 | Mast | 350/444 |
| 4,554,448 | 11/1985 | Sillitto | 350/442 |
| 4,835,378 | 5/1989 | Coops | 369/45 |
| 4,835,380 | 5/1989 | Opheij et al. | 350/446 |

Primary Examiner—David C. Nelms
Attorney, Agent, or Firm—John F. Moran; Leroy Eason

[57] ABSTRACT

An optical scanning device having a mirror-objective arranged between a radiation source and an object to be scanned, which mirror objective is a radiation-transparent body having a radiation window and concentric reflector on each of two opposite surfaces of such body. By providing at least one of the windows with an aspherical shape, the mirror objective is well corrected for spherical aberrations without imposing stringent requirements on the accuracy of such aspherical shape.

18 Claims, 6 Drawing Sheets

OPTICAL SCANNING DEVICE, MIRROR OBJECTIVE SUITABLE FOR USE IN SAID DEVICE AND OPTICAL WRITE AND/OR READ APPARATUS PROVIDED WITH SAID DEVICE

BACKGROUND OF THE INVENTION

1. Field of the Invention

The invention relates to a scanning device for optically scanning an information plane, which device comprises a radiation source supplying a scanning beam and a mirror objective for focusing the scanning beam to a scanning spot in the information plane. The invention also relates to a mirror objective suitable for use in this scanning device and to a write an/or read apparatus provided with such a device.

Scanning an information plane is to be understood to mean both scanning for reading a prerecorded information plane and scanning for writing information in this plane by means of a radiation beam which is intensity-modulated in accordance with the information to be recorded. If a magneto-optical record carrier is recorded, the radiation beam may also have a constant intensity and the magnetic field may be modulated in accordance with this information to be recorded. The information plane may be a plane of an optical record carrier, but also a surface or a plane in an object to be examined, the scanning device then forming part of, for example a microscope.

2. Description of the Related Art

A scanning device as described in the opening paragraph, intended for reading an optical record carrier, is known from British Patent Specification No. 1,541,596. This specification describes an optical scanning device which includes an objective comprising two mirrors whose reflective sides face each other. The one mirror is concave and its reflective side faces the record carrier. The other mirror, which is much smaller, is convex and its reflective side faces the radiation source. The radiation from the radiation source reaches the convex mirror via a passage in the larger concave mirror. The radiation is subsequently reflected towards the concave mirror and focused by this mirror to a radiation spot in the information plane of the record carrier.

The known objective forms part of a two-stage focusing system in which the entire mirror system is suspended in a magnetic coil by which the position of the objective with respect to the record carrier is controlled. The small mirror is mounted on a piece of piezo-electric material and can be moved up and down with the aid thereof so that a small extent of defocus is periodically produced in the information plane, which defocus is detected by a detection device and from which subsequently a focus-error signal is derived which is used for re-adjusting the position of the objective by means of the magnetic coil.

By using two separate mirrors in a close working relationship with each other, the known scanning device has a rather complicated structure and is sensitive to mechanical perturbations.

SUMMARY OF THE INVENTION

It is an object of the present invention to provide a compact and robust scanning device whose mirror objective is well corrected for spherical aberrations and which can readily be manufactured because the requirements of accuracy need not be too stringent.

The scanning device according to the invention is characterized in that the mirror objective comprises a transparent body having a first surface facing the radiation source and a second surface remote from the radiation source, said first surface having a first radiation window which is located symmetrically around the optical axis of the mirror objective and having a first reflector surrounding said window, said second surface having a second reflector which is located symmetrically around the optical axis and a second radiation window surrounding the second reflector, the radiation path through the mirror objective extending via passage through the first window, reflection from the second reflector, reflection from the first reflector and passage through the second window, at least one of the two windows having an aspherical surface.

An aspherical surface in a lens system is understood to mean a lens element surface whose fundamental shape is spherical but whose real shape deviates therefrom to a small extent in order to correct for spherical aberration which would be produced when the lens element has spherical surfaces. The spherical fundamental shape may also have an infinitely large radius of curvature so that the said aspherical surface has a flat fundamental shape.

The scanning device comprising the said mirror objective is not only compact because the radiation path in this objective is folded, but the mirror objective is also well corrected for spherical aberration. According to the invention this is achieved by giving a radiation window an aspherical shape. Its advantage is that the required accuracy of the shape of the aspherical surface may be considerably smaller, for example by a factor of 5 to 6, than the required accuracy of the shape of a reflective aspherical surface. This provides the possibility of manufacturing the mirror objective and hence the complete scanning device at reasonably low cost.

The preferred embodiment of the scanning device according to the invention is characterized in that the second radiation window has an aspherical surface.

This embodiment is preferred to the first embodiment in which the first radiation window has an aspherical surface, because a larger diffraction-limited image field can be obtained, than with the first embodiment.

The scanning device according to the invention can be used for scanning a radiation-transparent information plane. The inventive concept is, however, used to best advantage in a scanning device for scanning a radiation-reflecting information plane in which radiation from the information plane is returned and traverses the mirror objective so as to be focused on a radiation-sensitive detection system which is arranged on the same side of the mirror objective as the radiation source. Such a scanning device is further characterized in that the mirror objective comprises a beam-separating element for spatially separating the beam emitted by the radiation source and the beam reflected from the information plane and focused by the mirror objective.

The beam-separating element may be a semi-transparent mirror or cube arranged on the first radiation window.

However, the scanning device comprising a beam-separating element is preferably further characterized in that the beam-separating element is a diffraction element. This diffraction element can be relatively simply arranged on one of the surfaces of the mirror objective and moreover it can fulfil a second function to be described hereinafter.

A preferred embodiment of the scanning device comprising a mirror objective provided with a diffraction element is characterized in that the diffraction element is reflective and is arranged on the second reflector.

A second embodiment of such a scanning device is characterized in that the diffraction element is radiation-transparent and is arranged on the first radiation window. The diffraction element may alternatively be accommodated in the body of the mirror objective. This body may comprise two parts, the diffraction element being arranged on one of the two facing surfaces of the two parts.

The diffraction element may be formed in such a manner that it renders the beam incident on the detection system suitable for focus-error detection, in conjunction with an adapted detection system. A focusing error is understood to mean a deviation between the focusing plane of the mirror objective and the information plane.

A first embodiment of the scanning device comprising a diffraction element shich is adapted for focus-error detection is characterized in that the diffraction element is an element introducing astigmatism and in that the radiation-sensitive detection system comprises four detectors which are arranged in four different quadrants around the chief ray of the beam diffracted by the diffraction element.

The element introducing astigmatism may be a linear grating which, due to its location in a non-parallel beam, introduces a certain extent of astigmatism in this beam. The shape of the radiation spot formed by this beam on the detection system is determined by the degree of focusing on the information plane.

In the case of a defocus this radiation spot is deformed to an elliptical spot whose major axis, dependent on the defocusing sign is located in one the two mutually perpendicular directions, also referred to as the astigmatic directions. The separating strip between the four detectors extend at angles of approximately 45° to the astigmatic directions.

If a larger extent of astigmatism is desired, the diffraction element may be a diffraction grating having straight grating strips and a linear grating period. Preferably, the astigmatic diffraction element is a holographic grating having curved grating strips and a non-linear grating period. Imaging errors such as coma can be corrected by adapting the curvatures.

It is to be noted that the use of a grating having a linear grating period in combination with a four-quadrant detector for generating a focus-error signal is known per se from U.S. Pat. No. 4,358,200. However, the device described in this patent does not comprise a mirror objective.

A second focus-error detection possibility which is preferred to the above-mentioned, so-called astigmatic method as far as temperature sensitivity and ease of control is concerned, is realised in an embodiment which is characterized in that the first diffraction element is a diffraction grating comprising two sub-gratings and splitting the diffracted scanning beam into two sub-beams and in that the composite detection system comprises two detector pairs, the first and second sub-beams co-operating with a first and a second detector pair, respectively.

In this device the scanning spot is re-imaged in two radiation spots on the detector pairs. Each radiation spot shifts transversely of the separating strip of the associated detector pair in dependence upon a focusing error of the scanning beam relative to the information plane. This shift can be detected by comparing the output signals of the detectors. This focus-error detection method is known as the double Foucault method.

A preferred embodiment of the last-mentioned device is characterized in that the sub-gratings have a varying grating period and in that the grating strips of the sub-gratings are curved.

Due to the varying grating period and the curved grating strips the composite grating has a lens action and by displacing this grating in the direction of the bounding line of the sub-gratings the energy distribution of the radiation spots can be rendered symmetrical with respect to the associated detector pairs, inter alia because the imaging distance of the assembly of objective system and the grating is adapted to the distance, in the direction of the optical axis, between the diode laser and the detectors. This is particularly important if the detectors, in the form of photodiodes, and the diode laser are combined in one component and are fixed relative to each other. A composite grating having varying grating periods and curved grating strips, which grating is also referred to as hologram, provides the possibility of correcting imaging errors such as coma and astigmatism which may occur when using a grating with straight grating strips.

In principle, there are two embodiments of a scanning device in which the Foucault focus-error detection method is used. The first embodiment is characterized in that the grating strips of the one sub-grating have the same main direction as those of the other sub-grating, in that the average grating periods of the sub-gratings are different and in that the detector pairs are juxtaposed in a direction parallel to the bounding line between the sub-gratings. In this embodiment the sub-beams of the scanning beam are diffracted in the same direction but at different angles.

The second embodiment is characterized in that the sub-gratings have the same average grating period, while the main directions of the grating strips of the one sub-grating extend at a first angle and those of the other sub-grating extend at a second angle to the bounding line of the two sub-gratings and in that the detector pairs are juxtaposed in a direction transversely of the direction of the said bounding line. Now the sub-beams of the scanning beam are preferably diffracted at the same angles but in different directions. This embodiment is preferred to the previous embodiment due to its better assembly tolerances, adjusting facilities and stability.

The use of a mirror objective with a transparent body in a scanning device may have further advantages with regard to the positioning of the radiation source and the radiation-sensitive detection system.

For example, an embodiment of the scanning device according to the invention is characterized in that the radiation source is connected to the first radiation window. The radiation source is, for example a semiconductor laser a radiation-emitting surface of which is provided on the radiation window, or the radiation source is connected to the radiation window via an optical fibre or a series of fibres.

Furthermore an embodiment of the scanning device according to the invention, provided with a radiation-sensitive detection system may be characterized in that the radiation-sensitive detection system is arranged on the first radiation window in the radiation path of radiation which has been reflected from the information plane and which has traversed the mirror objective.

The radiation source, the optical fibres or the radiation-sensitive detection system are secured to the first radiation window by means of, for example a transparent adhesive. This results in a single compact and robust, integrated component accomodating the entire optical section of the scanning device.

The various embodiments of the scanning device according to the invention may comprise different types of radiation sources such as, for example, a single semiconductor laser, a semiconductor laser array or another radiation source which can be connected to the mirror objective directly or by means of optical fibres.

BRIEF DESCRIPTION OF THE DRAWINGS

Embodiments of the invention will now be described in greater detail with reference to the accompanying drawings in which FIGS. 8 and 10 show the radiation-sensitive detection systems asssociated with these diffraction elements, and FIG. 11 shows a scanning device for a magneto-optical record carrier.

DESCRIPTION OF THE PREFERRED EMBODIMENTS

Figure 1:
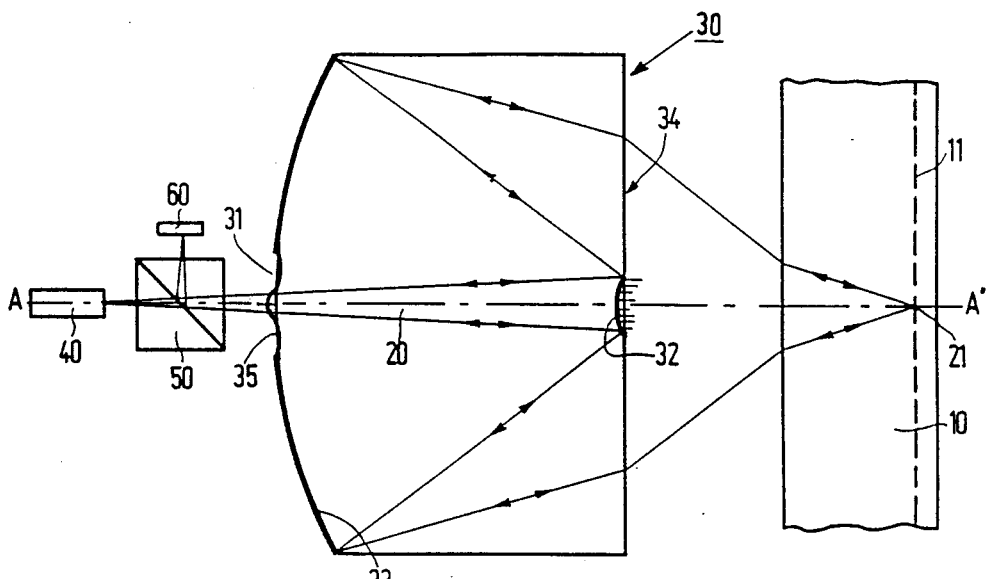
FIGS. 1, 2, 3 and 4 show various embodiments of the scanning device.

FIG. 1 is a sectional view of a portion of an optical record carrier 10 having a reflecting information plane 11. A scanning device comprising a mirror objective 30 and a radiation source 40 is provided close to the record carrier. The radiation source 40 emits a scanning beam 20 which is focused to a scanning spot 21 in the information plane 11 by the mirror objective 30. The entire information plane can be covered by the scanning spot because the scanning device and the record carrier are movable with respect to each other, for example because the record carrier can rotate around an axis (not shown) perpendicular to the plane of the record carrier and because the scanning device can move in the radial direction with respect to the same axis.

The scanning beam 20 traverses the mirror objective and the beam enters the transparent body of the objective via the first radiation window 31. Subsequently the scanning beam is reflected on the convex reflector 32, so that the scanning beam widens and is incident on substantially the entire surface of the concave reflector 33. This reflector reflects the scanning beam as a convergent beam which is focused to a scanning spot 21 in the information plane 11 via the radiation window 34 and a portion of the transparent record carrier 10.

In the case of a reflective information surface with which, for example, optically readable digital audio discs known under the name of "Compact Disc" are provided, the beam reflected at the spot 21 is received by the mirror objective again and traverses the reverse path therein to the radiation window 31. The reflected beam may enter the radiation source and when using a semiconductor laser as a radiation source, it can be detected thereby. This so-called feedback read-out is described, for example in German Patent Specification No. 1,584,664. Preferably, however, a beam-splitting element. for example, a splitting cube 50 through which a portion of the reflected radiation is separated from the scanning beam 20 and is projected on a radiation-sensitive detection system 60, is arranged in the common radiation path of the emitted and the reflected radiation beams. Since the radiation reflected from the information plane 11 is modulated with the information stored in said information plane and scanned by the radiation spot, the reflected radiation is converted by the system 60 into an electric signal suitable for further processing.

The beam focused by the mirror objective 30 exhibits spherical aberration. As is known, inter alia from U.S. Pat. No. 4,668,056, it is possible to correct for this aberration by using aspherical surfaces. It should be obvious that the reflecting surface 33 is given an aspherical shape so as to obtain a relatively large diffraction-limited image field. However, according to the invention, the surface of one or of both radiation windows 31 and 34 is aspherical. Though the image field is then reduced, it has been found that it is still sufficiently large for the envisaged object: scanning a surface by means of a diffraction-limited spot. The great advantage of rendering a radiation window aspherical is that the requirements which must be imposed on the accuracy of the shape of the asphere are considerably less stringent than such requirements for a reflecting surface. For an aspherical surface used in transmission the shape tolerances are a factor of $(n_1-n_2)/2n_1$ larger than those for an aspherical surface used in reflection. In this case $n_1$ is the refractive index of the lens material and $n_2$ is the refractive index of the surrounding medium.

For giving one or both radiation windows 31 and 34 of the mirror objective an aspherical shape the technique described in U.S. Pat. No. 4,668,056 for giving the surface of a conventional lens an aspherical shape can be used. A mirror objective is then obtained in which the aspherical surface of a radiation window is constituted by the aspherical outer surface of a transparent synthetic material layer which is provided on the spherical surface of this window. The synthetic material may be a polymerisable synthetic matrial, for example a material being cured under the influence of ultraviolet radiation which is applied on the window in a liquid state and is given the desired shape by means of a mould.

Figure 2:
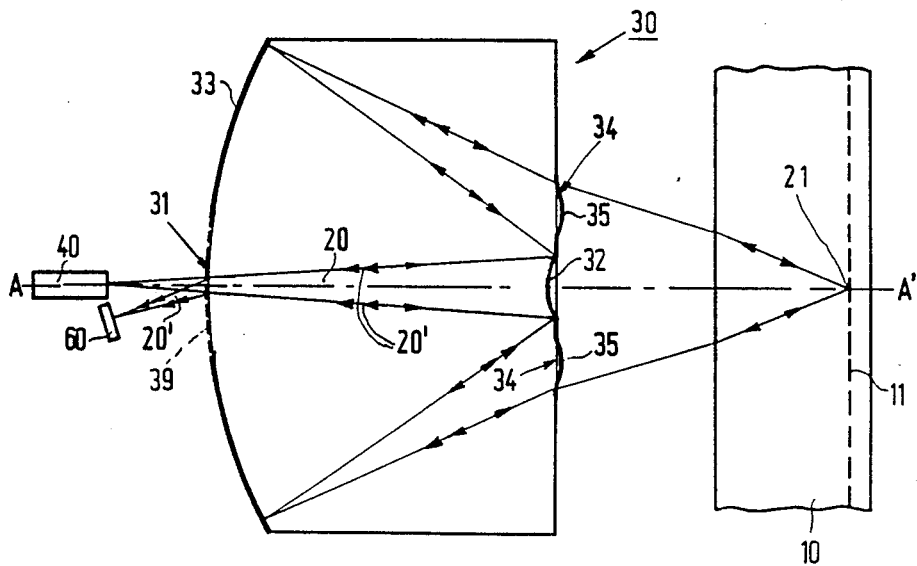

In the embodiment of FIG. 1 the first radiation window 31 has an aspherical surface 35. FIG. 2 shows a preferred embodiment in which the second radiation window 34 is aspherical. As compared with the first embodiment of FIG. 1, the embodiment in FIG. 2 has the advantage of a larger diffraction-limited image field. Like the embodiment of FIG. 1, the embodiment of FIG. 2 is suitable for reading a radiation-reflective information plane 11. The radiation reflected from this plane and received by the mirror objective 30 and condensed in a radiation beam 20' is separated from the beam 20 emitted by the radiation source 40 by means of a diffraction element 39 which is arranged on the radiation window 31.

The diffraction element 39 is, for example a diffraction grating having straight grating strips. This grating splits a beam incident thereon into a non-diffracted zero-order sub-beam and into two diffracted first-order sub-beams and a plurality of diffracted higher-order sub-beams. The grating parameters, such as the ratio between the width of the strips and those of the intermediate grating strips and, in the case of a phase grating, the shape and the depth of the grating grooves, can be chosen so that the intensity product of the zero-order sub-beam formed at the first passage through the grating and a first-order sub-beam formed at the second passage through the grating is a maximum. It can be ensured that the first-order sub-beams formed at the first passage through the grating 39 are diffracted through such an angle that the radiation of these beams does not reach the detection system 60 after reflection by the information plane 11.

In the embodiment of FIG. 2 the radiation source 40 and the radiation-sensitive detection system 60 are arranged at some distance from the radiation window 31. This provides the advantage that when using a holographic grating as a diffraction element a fine control is possible by moving the mirror objective with this grating relative to the detection system.

Figure 3:
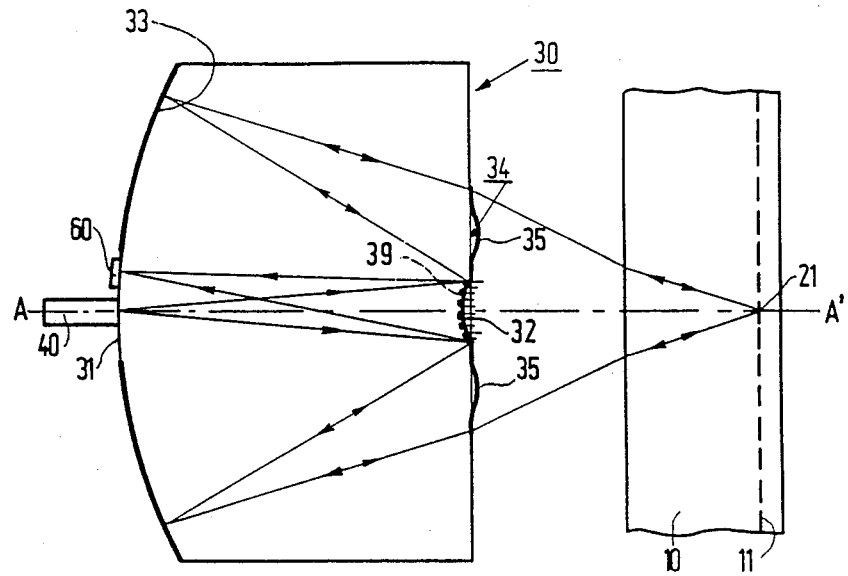

In the embodiment of FIG. 3 the radiation source 40 and the detection system 60 are arranged on the radiation window 31. The elements 40 and 60 may alternatively be connected to the window 31 via optical fibres. The grating 39 is now a reflecting grating and is arranged on the second reflector 32.

Figure 4:
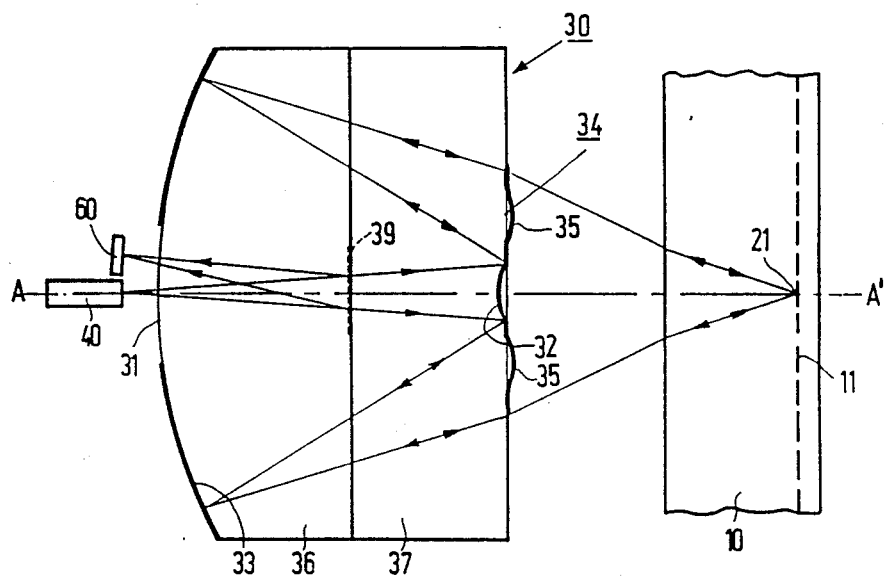

FIG. 4 shows an embodiment of the scanning device in which the diffraction grating 39 is arranged within the body of the mirror objective 30. This body is divided into two parts 36 and 37 in principle consisting of the same material and the grating is provided on one of the facing surfaces of the parts 36 and 37.

The grating 39 may be formed in such a way that the beam originating from this grating and facing the detection system 60 is suitable for supplying, in conjunction with an adapted detection system a focus error signal. A first embodiment of such a grating with the associated detection system is shown diagrammatically in FIG. 5. The beam 20' is shown by way of its cross-section at the area of the grating 39. This grating 39 comprises two sub-gratings 41 and 42 which are separated from each other by the line 43. The grating strips of the sub-gratings are denoted by the reference numerals 44 and 45, respectively. These grating strips are separated by intermediate strips 46 and 47. In this embodiment the sub-gratings have the same grating period, but the main directions of the preferably curved grating strips 44 of the sub-grating 41 extend at a first angle to the bounding line 43, while the main directions of the curved grating strips 45 of the second sub-grating 42 extend at a second, preferably equally large but opposite angle to the bounding line. The sub-beams are diffracted in a direction substantially transversely of the main directions. Since the main directions are different, the sub-beams $20_a'$ and $20_b'$ are diffracted at different angles in YZ plane. This means that in the plane of the detectors, the XY plane, the radiation spots $20_a'$ and $20_b'$ are displaced relative to each other in the Y direction. In this Figure and in the other Figures the references X, Y and X are the axes of a system of coordinates whose origin 0 coincides with the centre of the radiation-emitting surface of the diode laser 40.

Radiation-sensitive detectors in the form of photodiodes 48, 49 and 50, 51, which are separated by narrow strips 52 and 53, are associated with each of the sub-beams $20_a'$ and $20_b'$, respectively. These detectors are positioned in such a way that in the case of a correct focusing of the beam 20 on the information plane 11 the intensity distribution of the radiation spots $22_a$ and $22_b$ formed by the sub-beams $20_a'$ and $20_b'$ is symmetrical relative to the detectors 48, 49 and 50, 51, respectively. When a focusing error occurs, the radiation spots $22_a'$ and $22_b'$ will become asymmetrically larger and the centre of the radiation distribution of each radiation spot is displaced transversely of the separating strips 52 and 53, respectively, of the associated detector pair.

If the output signals of the detectors 48, 49, 50 and 51 are represented by $S_{48}$, $S_{49}$, $S_{50}$ and $S_{51}$, respectively, the focus-error signal $S_f$ will be given by:

$$S_f = (S_{48} + S_{51}) - (S_{49} + S_{50})$$

A signal which is proportional to the information being read, or the information signal $S_i$ is given by $$S_i = S_{48} + S_{49} + S_{50} + S_{51}$$

Figure 5:
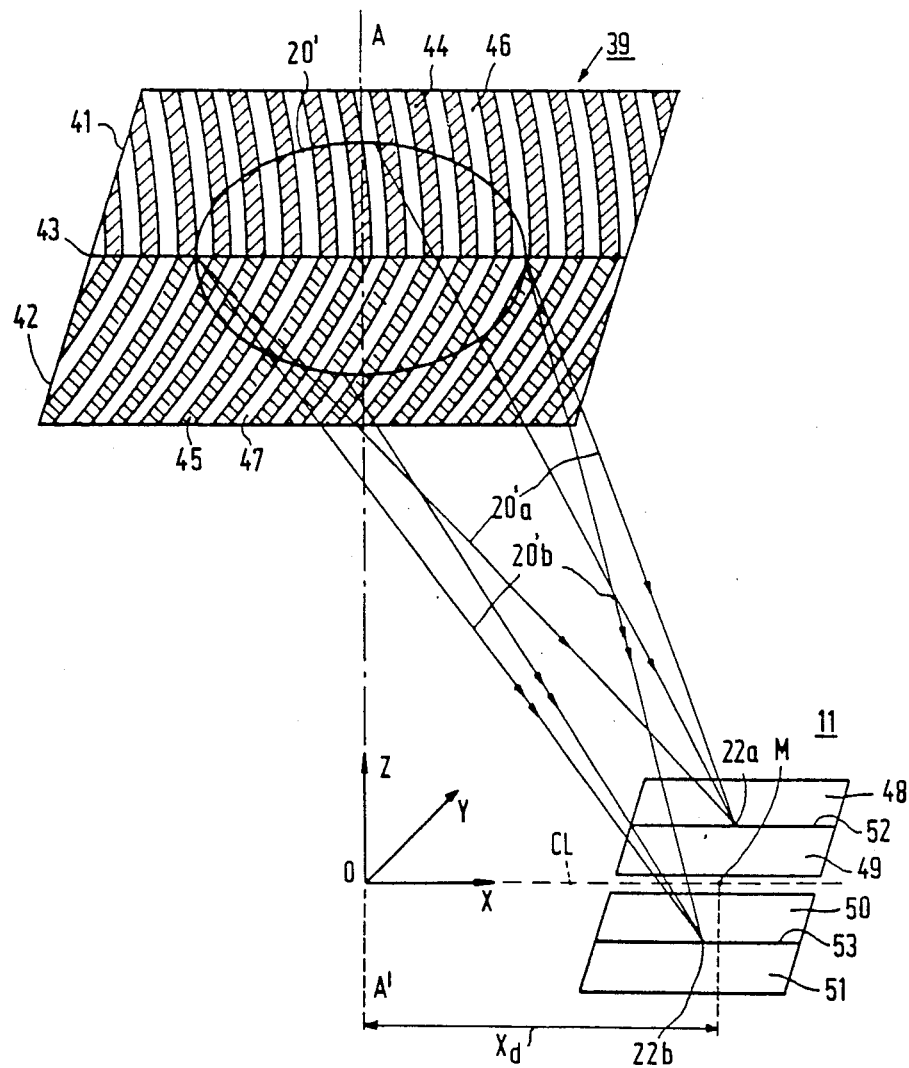
FIGS. 5 and 6 show two embodiments of a diffraction element to be used in this device, with which element two sub-beams are obtained.
Figure 6:
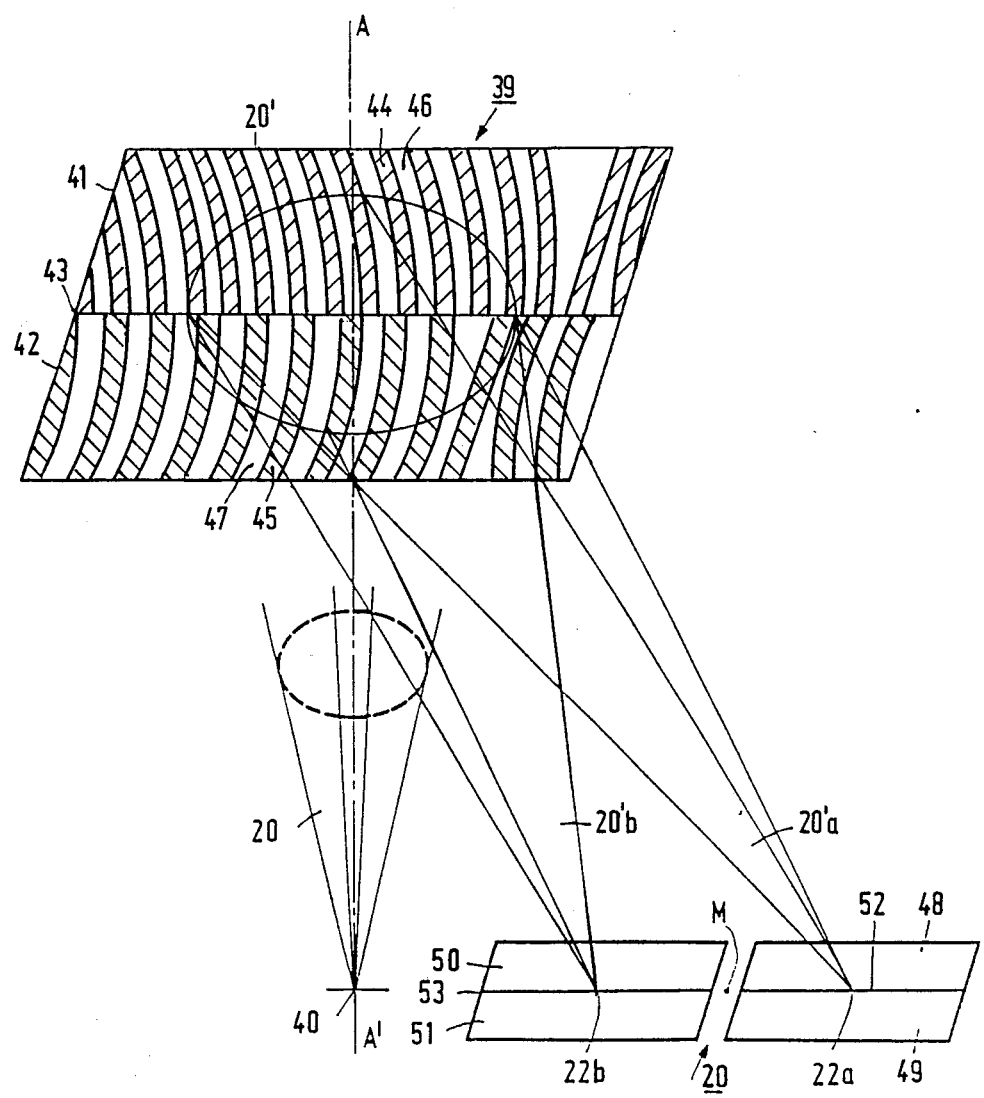

Not only the composite grating of FIG. 5 but also the grating 39 shown in FIG. 6 can be used for generating a focus-error signal. In this Figure the scanning beam 20 and the reflected beam 20' are shown by means of their cross-section in the plane of the grating, with the sub-beams $20_a'$ and $20_b'$. The main directions of the preferably curved grating strips of the two sub-gratings 42 and 43 now extend at the same angle to the bounding line 43, while the average grating periods of the two sub-gratings are different. Consequently, the angle at which the sub-beam $20_a'$ is diffracted is different from the angle at which the sub-beam $20_b'$ is difracted. This means that in the plane of the detectors 48, 49, 50 and 51 the radiation spots $22a$ and $22b$ are displaced relative to each other in the direction of the bounding line 43.

The sub-gratings 41 and 42 may have straight grating strips and a constant grating period. However, preferably a type of grating, also referred to as holograms, is used which has a varying grating period, the variation in the period being, for example of the order of several percents of the average grating period. Moreover, the grating strips of the two sub-gratings are curved, as is shown in FIGS. 5 and 6. Thus, these sub-gratings have a variable lens action. Due to the varying grating period the positions of the radiation spots $22_a$ and $22_b$ can be varied by displacing the grating 9 in its own plane. Aberrations in a direction perpendicular to the direction of the bounding line 43 can be minimised by suitable curvatures of the grating strips. The possibility of moving the positions of the radiation spots is particularly important if an integrated laser-photodiode unit is used, i.e. a component in which the diode laser and the photodetectors are arranged on one support and are therefore fixed relative to each other and thus have a fixed mutual distance in the Z direction. This distance is subject to close manufacturing tolerances, and cannot be corrected during assembly of the device by displacing the photodiodes relative to the laser diode in the Z direction.

An important advantage of the diffraction grating having curved grating strips, or hologram, as compared with a grating having straight grating strips is that the optical aberrations such as coma and astigmatism, which may occur when using the last-mentioned grating, can be avoided in the first-mentioned grating by taking these aberrations into account when manufacturing this holographic grating and by adapting the curvatures of the grating strips accordingly.

Figure 7:
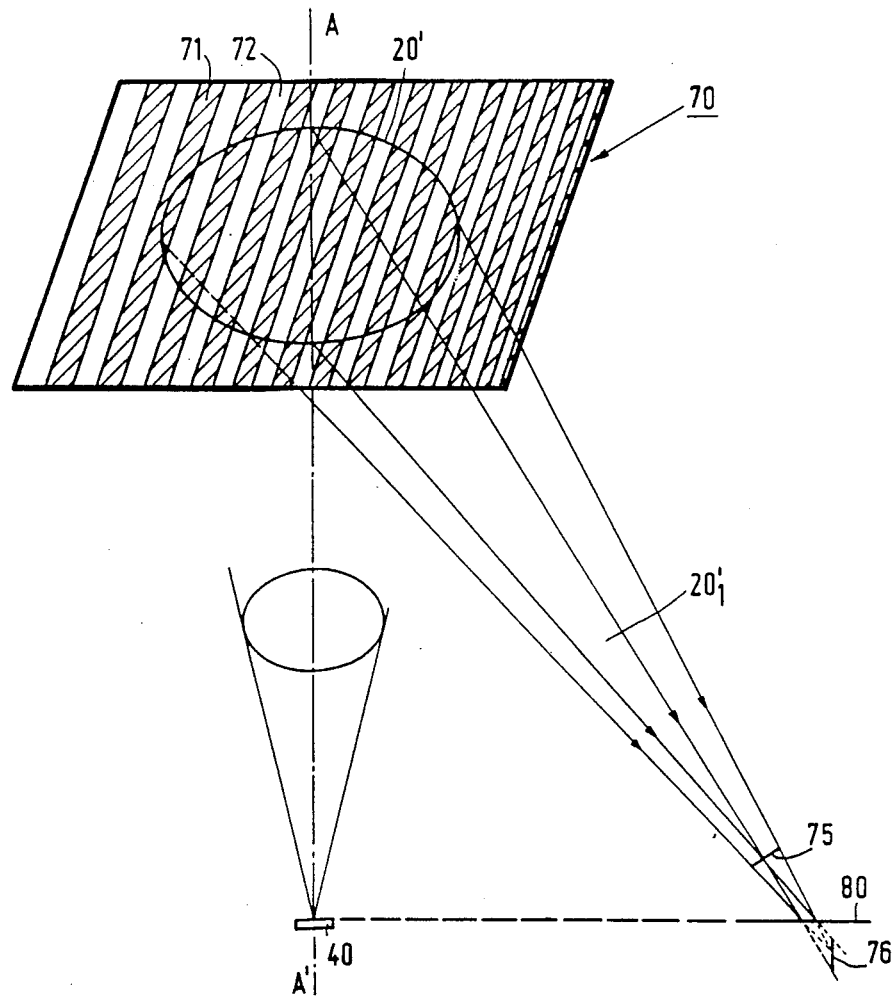
FIGS. 7 and 9 show two embodiments of a diffraction element with which an astigmatic beam is obtained.
Figure 8:
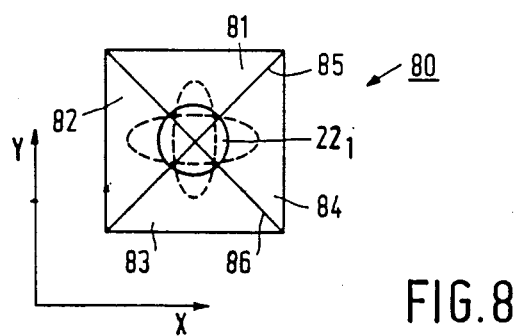

FIG. 7 shows an embodiment of a grating 70 converting the reflected scanning beam 20' into an astigmatic beam $20_1'$. This grating has straight grating strips 71 and a linearly varying grating period. The grating is dimensioned in such a way that the radiation of the beam 20' is largely diffracted in one order, for example the first order. The first-order beam $20_1'$ is no longer focused in one point but in two mutually perpendicular focal lines 75 and 76, the line 75 being located in a position where the beam $20_1'$ would be focused if the grating were not astigmatic. When a focusing error occurs, the focal lines 75 and 76 are simultaneously displaced in the same direction and over the same distance. A so-called four-quadrant detector 80 is arranged in a plane approximately halfway between the positions occupied by the astigmatic focal lines, if the scanning beam is sharply focused on the information plane. This detector, shown in FIG. 8, comprises four detectors 81, 82, 83 and 84 which are arranged in four different quadrants around the chief ray of the diffracted beam $20_1'$. If the scanning beam is sharply focused on the information plane 11, the radiation spot $22'$ formed by the beam $20_1'$ in the plane of the detectors is round, as is illustrated by the solid line circle in FIG. 8. If a focusing error occurs, the radiation spot $22_1'$ is deformed to an elliptical spot, as illustrated by the broken line ellipses in FIG. 8. The major axis of the ellipse extends at an angle of 45° to the separating strips 85 and 86, the sign of the angle being determined by the sign of the focusing error. If the signals of the detectors 81, 82, 83 and 84 are represented by $S_{81}$, $S_{82}$, $S_{83}$ and $S_{84}$, the focus-error signal $S_f$ will be given by:

$$S_f = (S_{81} + S_{83}) - (S_{82} + S_{84}).$$

Also the grating 70 may be in the form of a holographic grating having curved grating strips, thus providing the said adjusting and correction possibilities.

Figure 9:
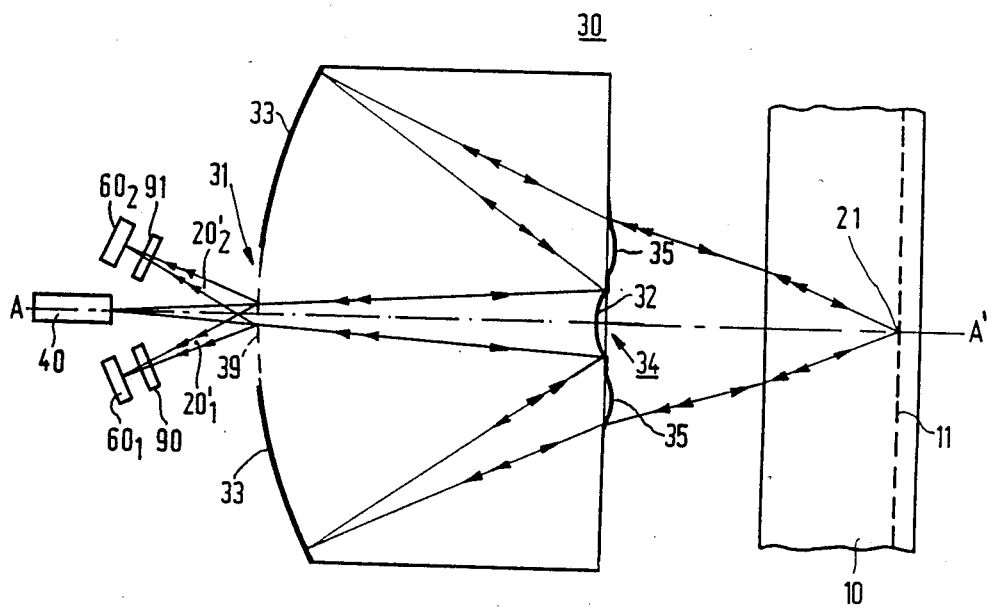

FIG. 9 shows an embodiment of the scanning device specially suitable for writing and reading so-called magneto-optical record carriers. Such record carriers and write and read apparatuses therefor are described in the inter alia the Article "Erasable magneto-optical recording" in "Philips Technical Review" Vol. 42, No. 2, 1985, pages 37–47. As described in this Article, a so-called differential method is used when reading a magneto-optical record carrier. The radiation which is reflected by the information plane and whose direction of polarisation is time-modulated in accordance with the information which has been read, is split after passage through the objective into two mutually perpendicularly polarised sub-beams which are incident on separate detectors. In the known device beam splitting is realised by means of a polarisation-sensitive beam splitter.

In the scanning device of FIG. 9 such a beam splitter is no longer required because the grating 39 supplies two spatially separated beams $20_1'$ and $20_2'$, preferably the +1 order beam and the −1 order beam. It can be ensured that these beams have the same intensity. Polarisers 90 and 91 are arranged between the detectors $60_1$ and $60_2$ so that the beam $20_1'$ incident on the detector $61_1$ has a first direction of polarisation and the beam $20_2'$ incident on the detector $60_2$ has a second direction of polarisation which is perpendicular to the first direction of polarisation.

In FIG. 9 the grating 39 is provided on the first radiation window 31. However, this grating is preferably provided on the reflector 32 because then the scanning device can be constructed in the most compact manner. This also applies to the other embodiments.

The invention has been described for use in a read apparatus, but it may alternatively be used in a write apparatus or in a combined write-read apparatus in which during recording the focusing and the tracking of the write beam are monitored. The focus-error and tracking-error detection systems described do not utilise special properties of the information surface 2. It is merely necessary and adequate that this surface is reflecting. Therefore the invention may be used in various scanning devices.

We claim:

1. A scanning device for optically scanning an information plane, which device comprises a radiation source supplying a scanning beam and a mirror objective for focusing the scanning beam to a scanning spot in the information plane, characterized in that the mirror objective comprises a transparent body having a first surface facing the radiation source and a second surface remote from the radiation source, said first surface having a first radiation window which is located symmetrically around the optical axis of the mirror objective and having a first reflector surrounding said window, said second surface having a second reflector which is located symmetrically around the optical axis and a second radiation window surrounding the second reflector, the radiation path through the mirror objective extending via passage through the first window, reflection on the second reflector, reflection on the first reflector and passage through the second window, at least one of the two windows having an aspherical surface.

2. A scanning device as claimed in claim 1, characterized in that the second radiation window has an aspherical surface.

3. A scanning device as claimed in claim 1 or 2 for scanning a radiation-reflecting information plane in which radiation from the information plane traverses the mirror objective so as to be focused on a radiation-sensitive detection system which is arranged on the same side of the mirror objective as the radiation source, characterized in that the mirror objective comprises a beam-separating element for spatially separating the beam emitted by the radiation source and the beam reflected from the information plane and focused by the mirror objective.

4. A scanning device as claimed in claim 3, characterized in that the beam-separating element is a diffraction element.

5. A scanning device as claimed in claim 4, characterized in that the diffraction element is reflective and is arranged on the second reflector.

6. A scanning device as claimed in claim 4, characterized in that the diffraction element is radiation-transparent and is arranged on the first radiation window.

7. A scanning device as claimed in claim 4, characterized in that the transparent body of the mirror objective comprises two parts which are arranged against each other, and the diffraction element is radiation-transparent and is arranged on one of the two facing surfaces of the two parts.

8. A scanning device as claimed in claim 4, 5, 6 or 7, characterized in that the diffraction element is an element introducing astigmatism and in that the radiation-sensitive detection system comprises four detectors which are arranged in four different quadrants around the chief ray of the beam diffracted by the dffraction element.

9. A scanning device as claimed in claim 4, 5, 6 or 7, characterized in that the diffraction element is a diffraction grating comprising two sub-gratings which split the diffracted beam into two sub-beams and in that the detection system comprises two detector pairs; a first and a second sub-beam respectively being incident on a first and a second detector pair.

10. A scanning device as claimed in claim 9, characterized in that the sub-gratings have a varying grating period and in that the grating strips of the sub-gratings are curved.

11. A scasnning device as claimed in claim 9, characterized in that the grating strips of the one sub-grating have the same main direction as those of the other sub-grating, the average grating periods of the sub-gratings are different, and the detector pairs are juxtaposed in a direction parallel to the bounding line between the sub-gratings.

12. A scanning device as claimed in claim 9, characterized in that the sub-gratings have the same average grating period, the main directions of the grating strips of the one sub-grating extend at a first angle and those of the other sub-grating extend at a second angle to the bounding line of the two sub-gratings, and the detector pairs are juxtaposed in a direction transversely of the direction of the said bounding line.

13. A scanning device as claimed in claim 1 or 2 characterized in that the radiation source is connected to the first radiation window.

14. A scanning device as claimed in claim 3, characterized in that the radiation-sensitive detection system is arranged on the first radiation window in the radiation path of radiation has been reflected from the information plane and which has traversed the mirror objective.

15. A scanning device as claimed in claim 1, wherein one of said first and second surfaces of said transparent body has a layer of transparent synthetic material thereon having an aspherical outer surface which constitutes said aspherical surface of said one radiation window.

16. A scanning device as claimed in claim 2, wherein said second surface of said transparent body is spherical and has a layer of transparent synthetic material thereon having an aspherical outer surface which constitutes said aspherical surface of said second radiation window.

17. A scanning device as claimed in claim 10, characterized in that the grating strips of the one sub-grating have the same main direction as those of the other sub-grating, the average grating periods of the sun-gratings are different, and the detector pairs are juxtaposed in a direction parallel to the bounding line between the sub-gratings.

18. A scanning device as claimed in claim 10, characterized in that the sub-gratings have the same average grating period, the main direction of the grating strips of the sub-grating extend at a first angle and those of the other sub-grating extending at a second angle to the bounding line of the two sub-gratings, and the detector pairs are juxtaposed in a direction transversely of the direction of the said bounding line.

* * * * *